United States Patent
Ota

[11] Patent Number: 6,016,134
[45] Date of Patent: Jan. 18, 2000

[54] LIQUID CRYSTAL DISPLAY DEVICE HAVING A TRANSPARENT INPUT TOUCH PANEL

[75] Inventor: Yuichi Ota, Hadano, Japan

[73] Assignee: Ricoh Company, Ltd., Tokyo, Japan

[21] Appl. No.: 08/816,425

[22] Filed: Mar. 14, 1997

[30] Foreign Application Priority Data

Mar. 14, 1996 [JP] Japan .................................. 8-085675

[51] Int. Cl.[7] .................................................. G09G 3/36
[52] U.S. Cl. ........................ 345/104; 345/173; 178/18.03
[58] Field of Search ........................... 345/104, 173–183; 349/12; 178/18.01, 18.03–18.08, 18.09

[56] References Cited

U.S. PATENT DOCUMENTS 4,686,332  8/1987  Greanias et al. .
4,931,782  6/1990  Jackson .
5,386,219  1/1995  Greanias et al. .

*Primary Examiner*—Regina Liang
*Attorney, Agent, or Firm*—Oblon, Spivak, McClelland, Maier & Neustadt, P.C.

[57] ABSTRACT

A liquid crystal display device having a transparent input touch panel provided on a liquid crystal display panel, including a transparent sheet layer in the region corresponding to an effective area of the transparent input touch panel and the picture element area of liquid crystal display panel between the transparent input touch panel and the liquid crystal display panel; and at least one of a cohesive sheet layer, an adhesive sheet layer and a spacer of coherent strength larger than that of the transparent sheet layer provided in the plane of the transparent sheet layer around at least a portion a periphery of the transparent sheet layer.

17 Claims, 3 Drawing Sheets

LIQUID CRYSTAL DISPLAY DEVICE HAVING A TRANSPARENT INPUT TOUCH PANEL

BACKGROUND OF THE INVENTION

CLAIM FOR BENEFIT OF PRIORITY

Applicants claim benefit of priority under 35 USC 119 based on Japanese Patent Application No. 08-085675 filed on Mar. 14, 1996, the entire disclosure of which, including specification, claims, drawings and summary, is incorporated herein by reference in its entirety.

1. Field of the Invention

This invention relates to a liquid crystal display device, and more particularly to such a device having a touch panel arranged on a liquid crystal display screen.

2. Discussion of the Background

In the prior art, when a touch panel is arranged on the front of a liquid crystal display screen, a gap is provided between the display screen and the touch panel. This prevents irregularities of colors arising from touching of a distorted touch panel to the liquid crystal display screen. However, providing the gap produces an air layer between the display screen and the touch panel, which decreases the transmission rate of light beam, and further reduces the display quality.

To solve these problems, the gap between the touch panel and the lower supporting plate of the display screen is cohered using a transparent double-sided cohesive sheet, which eliminates the air in the gap, as disclosed in Japanese utility-patent publication (Jitsu-Ko-Hei) 3-37055 and Japanese utility-patent publication (Toku-Kai-Hei)7-105781. At the time of adhering the touch panel of plastic substrate to the liquid crystal display panel using the transparent double-sided cohesive sheet, curves may be produced on both the panels in consequence of application of heat and elapsed time, which may further cause the transparent cohesive sheet to be peeled off from the liquid crystal display panel or touch panel. Such cohesive sheet being peeled off from both the panels arises due to a reduction in the adhesive strength due to decreasing the viscosity to restrain the generation of irregularities of the colors on the liquid crystal display surface by pushing and pressing from the surface of touch panel, using a cohesive sheet without a base material in order to raise the degree of transparency.

When the touch panel and the liquid crystal display panel are adhered using the transparent cohesive sheet without base material, raising the adhesive strength to prevent the cohesive sheet being peeled off from the panels causes an increase in hardness of the sheet itself, which largely influences the liquid crystal display screen when pushing and pressing the touch panel.

SUMMARY OF THE INVENTION

Accordingly, the objects of the present invention are to provide a liquid crystal display device with a transparent input touch panel in which the problem for reducing the influences given to the touch panel and the liquid crystal display screen is solved, and in which the problem of peeling off of the touch panel from the liquid crystal display panel is prevented.

These and other objects are achieved by providing a new and improved liquid crystal display device having a transparent input touch panel provided on a liquid crystal display panel, including a transparent sheet layer in the region corresponding to an effective area of the transparent input touch panel and the picture element area of liquid crystal display panel between the transparent input touch panel and the liquid crystal display panel; and at least one of a cohesive sheet layer, an adhesive sheet layer and a spacer of coherent strength larger than that of said transparent sheet layer provided in the plane of the transparent sheet layer around at least a portion a periphery of the transparent sheet layer.

Thus, this invention provides a liquid crystal display device having a transparent input touch panel wherein the problem of preventing peeling off the touch panel and liquid crystal display panel is solved with almost no influence to the touch panel and liquid crystal display screen.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
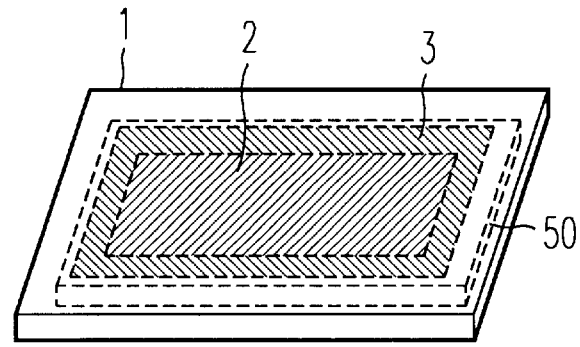
FIG. 1. is a perspective illustration of an embodiment of the present invention.
Figure 2:
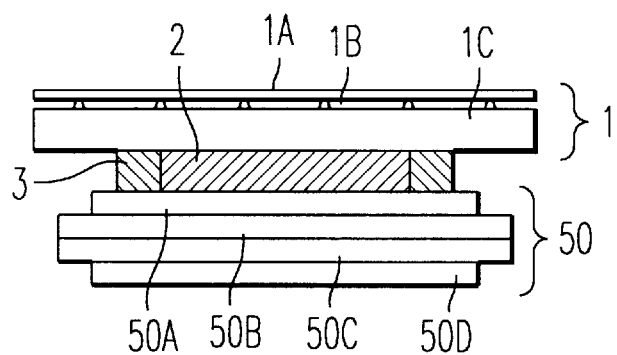
FIG. 2. is a side elevation view of the embodiment of the present invention showing in FIG. 1.

Referring now to the drawings wherein like reference numerals designate identical or corresponding parts throughout the several views, and more particularly to FIGS. 1 and 2 thereof, FIGS. 1 and 2 illustrate the construction of one embodiment of the liquid crystal display device according to this invention. In this embodiment, a touch panel 1 includes an upper substrate 1a having a transparent conductive film formed thereon by means, for example, of the resistance film method, small spacers 1b provided to maintain a specified gap, and a lower substrate 1c on which a conductive film is arranged. As the composition materials for the lower substrate 1c of the touch panel 1, glass or transparent synthetic resin, for example, polycarbonate is used. However, the touch panel 1 used for the preferred embodiment according to this invention may be of the shape or construction which can be used upon attaching it on the liquid crystal display panel 50, but not limited to the construction or shape as shown in FIG. 1 and FIG. 2.

Between the lower substrate 1c of the touch panel 1 and a polarizing plate 50a of a liquid crystal display panel 50 is provided, in a region corresponding to the effective area of touch panel 1 and the display area of liquid crystal display panel, transparent sheet layers 2 in the form of transparent cohesive sheet layers and/or transparent elastic body layers are provided. Providing these transparent sheet layers 2 allows the device to have two functions, the one to prevent any loss of the transparency of touch panel without generating Newton's ring, and the other to prevent peeling off any attached sheet from the panels due to the curves on both the touch panel 1 and liquid crystal display panel 50 in case of attaching the touch panel 1 and liquid crystal display panel 50 when the transparent sheet layers are transparent cohesive sheet layers. Further, provision of a transparent cohesive sheet layer having elasticity in addition to adhesiveness is favorable because it can absorb any deformation of touch panel due to said elasticity.

Moreover, when the transparent sheet layers 2 are transparent elastic bodies, the degree of elasticity is such that they can absorb any deformation of the touch panel, and can prevent generating any deformation in the liquid crystal display device 50.

Further, according to this invention, the LCD 50 may not be transparent on the outside of the transparent sheet layers 2 beside the transparent sheet layers 2, and there may be provided cohesive and/or adhesive sheet layers 3 having an adhesive strength larger than that of sheet layer 2 around the periphery of the sheet layer 2.

By providing the cohesive and/or adhesive sheet layers 3 as stated above, the transparent sheet layers 2 provided in the territory corresponding to the effective area of touch panel 1 and the screen area of liquid crystal display panel 50 may not be adhesive or may have weak adhesive strength, so materials which satisfy requirements of transparency and elasticity, and so forth required for the transparent sheet layers 2 can be widely selected.

The transparent cohesive sheet materials without base material generally used, for example, acrylic cohesive materials, have a thickness of 0.2 to 0.3 mm, but the thickness of the transparent cohesive sheet layer without base material used for the transparent sheet layer according to this invention is greater, for example 0.4 to 0.6 mm, and preferably 1 to 3 mm. When the thickness of said transparent cohesive sheet layer is not larger than 0.4 mm, it is difficult to keep constant the gap of the liquid crystal layer of the liquid crystal panel when fixing the transparent cohesive sheet layer to the liquid crystal display device 50, which is liable to appear as irregularities in colors.

Also, when the thickness of transparent cohesive sheet layer is not less than 6 mm, a parallax is generated between the display and the touching position.

Further, the adhesive strength of said transparent cohesive sheet layer is favorably in the degree of 10 to 5,000 g.

The transparent cohesive sheet layer is composed of, for example, polyacrylic acid, ester, poly-silicone, polyester, and so forth as major compositions without using base materials, from the viewpoint of the transparency and elasticity.

Figure 6:
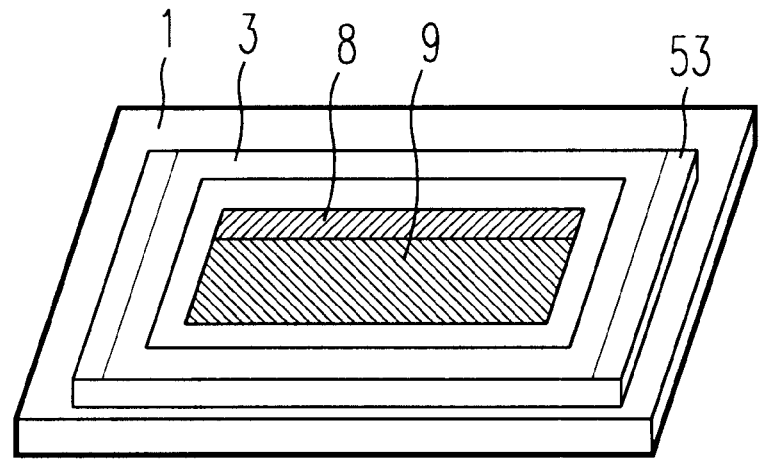
FIG. 6. is a perspective illustration of another embodiment of the present invention including a color silicone layer 8 and a transparent silicone layer 9 with the transparent sheet layer 2.
Figure 7:
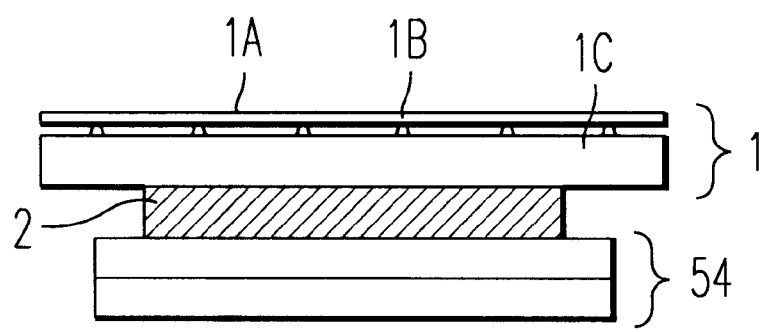
FIG. 7 is a side elevation view of a prior art liquid crystal display device.

Also, silicone is favorable for the transparent elastic body used as the transparent sheet layer according to this invention, from the viewpoint of the transparency and elasticity. The transparent elastic body is composed of a elastic body which at least has some colored portions. For example, as shown in FIG. 6, providing the transparent sheet layer 2 with a colored silicone layer 8 and a transparent silicone layer enables obtaining a liquid crystal display device with colored indication icons.

The cohesive and/or adhesive sheet layers 3 are different from the transparent sheet layer 2, and may include a base material since there is no problem of transparency at the location of the layers 3. Also the peel strength of the layer 3 is preferably larger than the peel strength of the transparent sheet layer 2, usually in the degree of 1 to 5 kg.

As the cohesive agent composing the cohesive sheet layer 3, a rubber cohesive agent with a large adhesive strength, for example, isobutylene-isoprene rubber cohesive agent, acrylic cohesive agent, and so forth are referred to. Also, an adhesive agent can be used instead of the cohesive agent, or together with the cohesive agent. Also, as the base materials of the cohesive and/or adhesive sheet layers 3, those usually used as the base materials of the cohesive sheet layer or the adhesive sheet layer can be referred to. Particularly, according to this invention, those materials having buffer functions are favorable, and as such base materials, non-woven fabrics, acrylic forms, and so forth are referred to.

Providing the cohesive and/or adhesive sheet layers 3 of larger adhesive strength as stated above prevents curving of the touch panel 1 and liquid crystal display panel 50 and prevents both the panels from their peeling off, and further it is effective against peeling off due to mechanical shocks such as falling shocks, even when using soft transparent sheet layers 2 of weak adhesive strength or with entirely no adhesive strength so that there is no actual influence on the display of liquid crystal display panel 50 within the effective area of touch panel.

The cohesive and/or adhesive sheet layers 3 can be provided in the various modes.

Figure 3:
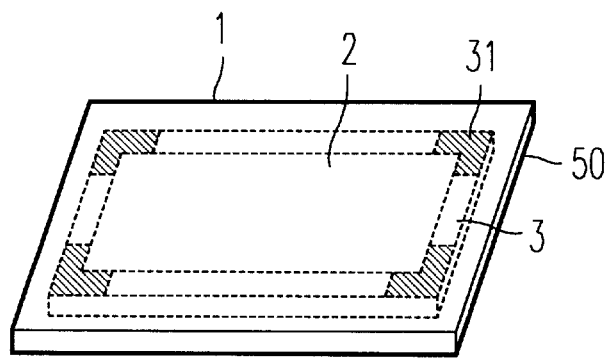
FIG. 3. is a perspective illustration of another embodiment of the present invention in which rubber cohesive sheet layers 31 of particularly large striking strength, considering the necessity of anti-striking on the four corner sections.

FIG. 1 shows said cohesive and/or adhesive sheet layers 3 contacted to and provided around the entire outer circumference of transparent sheet layer 2. The cohesive and/or adhesive sheet layers 3 need not comprise a single material, but may comprise multiple materials of various chemical and/or physical characteristics, for example, may comprise rubber cohesive sheet layer 31 of particularly large striking strength, considering the necessity of anti-striking on the four corner sections as shown in FIG. 3.

Further, the cohesive and/or adhesive sheet layers 3 need not be provided around the entire outer circumference of transparent sheet layer 2, but may be provided around part of the outer circumference, for example, only at the corner sections of transparent sheet layer which necessitate anti-striking measures. However, in this case, the sheet layer provided at only the corner sections may have not only larger anti-striking capability, but also may have stronger adhesive strength than those used in case when the layers 3 are provided around the entire outer circumference of transparent sheet layer 2.

Also, the cohesive and/or adhesive sheet layers 3 as shown in FIGS. 1 and 2 are shown directly contacted to and provided with the outer circumference of transparent sheet layer 2, but need not be directly contacted to and provided with the outer circumference of transparent sheet layer 2. Instead the layers 3 may be provided with some gap between the layers 3 and the transparent cohesive sheet layer 2.

Figure 4:
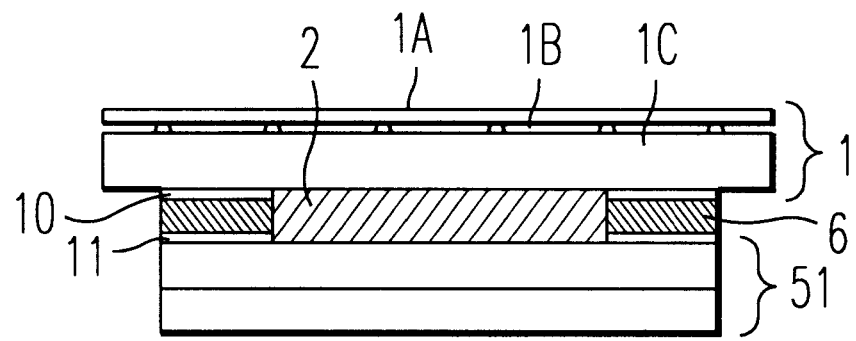
FIG. 4. is a side elevation view of yet another embodiment of the present invention in which there is provided a spacer 4 having the cohesive and/or adhesive layers 10 and 11 on the outside of transparent sheet layer 2 between the liquid crystal display panel 50 and the lower substrate 1c of touch panel 1, instead of the cohesive and/or adhesive sheet layers 3, or on both the upper and lower surface of the outside of said sheet layer 3.

FIG. 4 shows another embodiment of the construction of a liquid crystal display device according to this invention. In this embodiment there is provided a spacer 4 having cohesive and/or adhesive layers 10 and 11 on the outside of transparent sheet layer 2 between the liquid crystal display panel 50 and the lower substrate 1c of touch panel 1, instead of the cohesive and/or adhesive sheet layers 3. Alternatively, the layers 10 and 11 may be provided on both the upper and lower surface of the outside of the sheet layer 3. When the transparent sheet layer 2 is formed without using a base material, particularly, the transparent cohesive sheet without using the base material, its thickness becomes thinner due to the change of elapsed time, which causes the change of a gap between the liquid crystal display panel and the touch panel, which may further give large influences to the liquid crystal display panel. Using the spacer 4 prevents such influences.

The spacer 4 is comprised of, for example, materials such as ABS resin.

Figure 5:
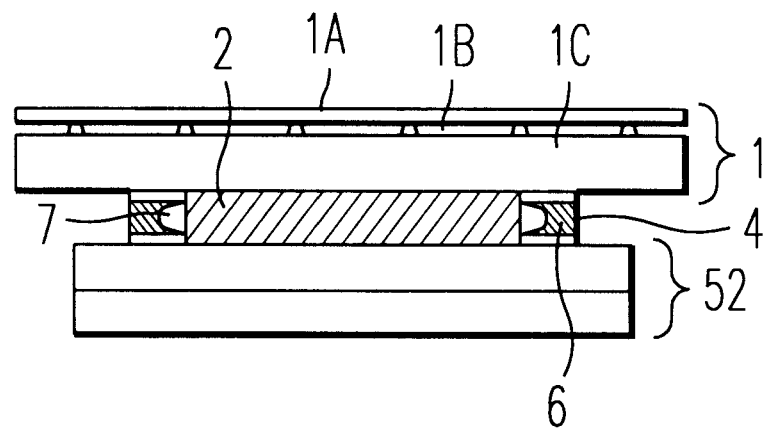
FIG. 5. shows a side elevation view of further another embodiment of the present invention in which a light emitting device 7 such as LED light chip, and so forth can be arranged in and provided with said spacer 4, and having the function as the side light.

Also, a light emitting device such as LED light chip 7, and so forth can be arranged in within the spacer 4. Also the light emitting device 7 can function as a side light as shown in FIG. 5. Thereby, even the liquid crystal display panel of reflecting type can have improved display recognition in zero visibility. Particularly, the transparent sheet layer 2 plays a role of the diffusion plate and raises the illuminance. When the spacer has the LED light chip 7 as stated above, the thickness of spacer is around 1 to 0.5 mm.

For the materials of liquid crystal display panel according to this invention, those using substrates such as used in the usual liquid crystal display device such as polymer films, glass, and so forth can be utilized, and those using the polymer films as the substrates are particular useful.

FIG. 2 is a sectional view showing one embodiment of a liquid crystal display device according to this invention. In FIG. 2 the upper substrate 1a of touch panel 1 is comprised of a film substrate with a thickness of 0.1 mm and is provided with a transparent conductive film made of polyester, polycarbonate, and so forth. The lower substrate 1c of touch panel 1 is comprised of glass or polycarbonate with a thickness of 1 mm. A spacer with the small-diameter (in the degree of 20 μm) is arranged between said upper substrate 1a and said lower substrate 1c. Between the lower substrate 1c of touch panel 1 and the polarizing plate 50a of liquid crystal display panel 50 in a region corresponding to the effective area of touch panel 1 and the displaying area of liquid crystal display panel 50 there is provided the transparent cohesive sheet layer 2 with a thickness of around 0.5 mm and an adhesive strength of around 10 g, which is an acrylic adhesive without substrate.

A butyl rubber cohesive layer 3 is provided with and formed on both the sides of base materials, which are non-woven fabrics, contacting the outer circumference of the transparent cohesive sheet layer 2. The cohesive sheet layer 3 has a gross thickness of around 0.5 mm similar to the thickness of said transparent cohesive sheet layer 2 and a peel adhesive strength of around 1 kg, and the liquid crystal display device having the touch panel strongly cohered to the lower substrate 1c of touch panel 1 and the polarizing plate 50a of liquid crystal display panel 50 by said sheet layer 3, is formed.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. In a liquid crystal display device having a transparent input touch panel provided on a liquid crystal display panel, the improvement comprising:

a transparent sheet layer in the region corresponding to an effective area of the transparent input touch panel and the picture element area of liquid crystal display panel between the transparent input touch panel and the liquid crystal display panel; and at least one of a cohesive sheet layer and an adhesive sheet layer of coherent strength larger than that of said transparent sheet layer provided in the plane of the transparent sheet layer around at least a portion a periphery of the transparent sheet layer.

2. A liquid crystal display device according to claim 1, wherein the transparent sheet layer comprises an acrylic cohesive agent without base materials.

3. A liquid crystal display device according to claim 1, wherein the transparent sheet layer comprises a transparent elastic body.

4. A liquid crystal display device according to claim 1, wherein at least a part of the transparent sheet layer is colored.

5. A liquid crystal display device according to claim 2, wherein at least a part of the transparent sheet layer is colored.

6. A liquid crystal display device according to claim 3, wherein at least a part of the transparent sheet layer is colored.

7. A liquid crystal display device according to claims 1, 2, 3, 4, 5 or 6, comprising:

a spacer provided at an outside peripheral portion of said at least one of said cohesive sheet layer and the adhesive sheet layer between the transparent input touch panel and the liquid crystal display panel.

8. A liquid crystal display device according to claim 7, wherein a spacer has a light emission device.

9. A liquid crystal display device according to claim 8, wherein a light emission device has a function of a sidelight.

10. In a liquid crystal display device having a transparent input touch panel provided on a liquid crystal display panel, the improvement comprising:

a transparent sheet layer in the region corresponding to an effective area of the transparent input touch panel and the picture element area of liquid crystal display panel between the transparent input touch panel and the liquid crystal display panel; and a spacer of coherent strength larger than that of said transparent sheet layer provided in the plane of the transparent sheet layer around at least a portion a periphery of the transparent sheet layer.

11. A liquid crystal display device according to claim 10, wherein the transparent sheet layer comprises an acrylic cohesive agent without base materials.

12. A liquid crystal display device according to claim 10, wherein the transparent sheet layer comprises a transparent elastic body.

13. A liquid crystal display device according to claim 10, wherein at least a part of the transparent sheet layer is colored.

14. A liquid crystal display device according to claim 11, wherein at least a part of the transparent sheet layer is colored.

15. A liquid crystal display device according to claim 12, wherein at least a part of the transparent sheet layer is colored.

16. A liquid crystal display device according to claims 10, 11, 12, 13, 14 or 15, comprising:

said spacer having a light emission device.

17. A liquid crystal display device according to claim 16, wherein said light emission device has a function of a sidelight.

* * * * *